March 20, 1951  H. M. DIXON  2,545,607
JOINTING GAUGE FOR CIRCULAR SAWS
Filed Jan. 12, 1949
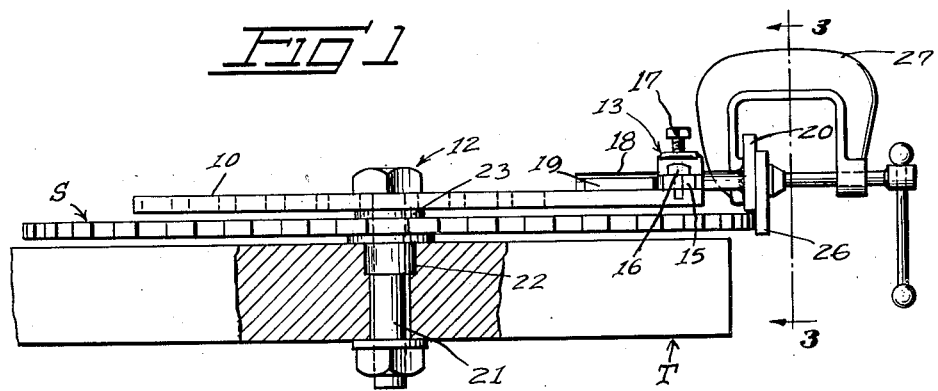
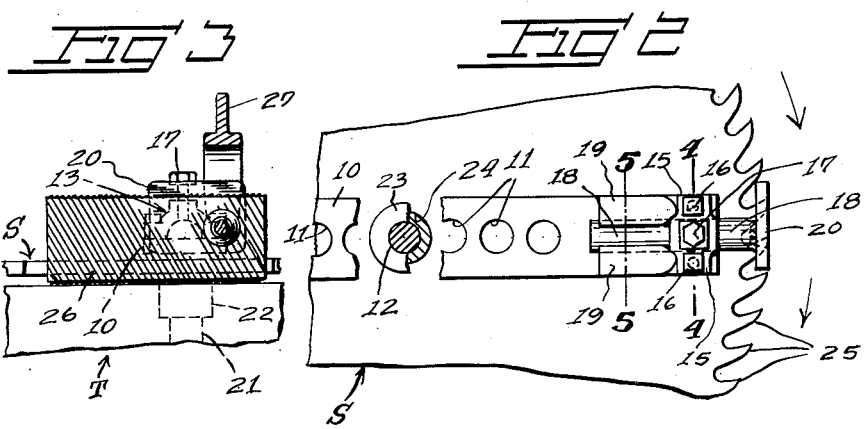
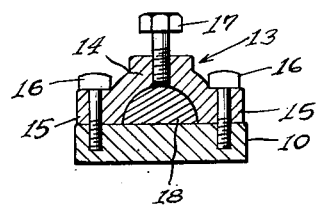
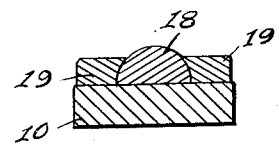
Inventor
Henry M. Dixon
By Wilfred E. Lawson
Attorney Patented Mar. 20, 1951

2,545,607

UNITED STATES PATENT OFFICE 2,545,607

JOINTING GAUGE FOR CIRCULAR SAWS

Henry M. Dixon, Miami, Fla.

Application January 12, 1949, Serial No. 70,580

1 Claim. (Cl. 76—48)

This invention relates generally to devices for use in connection with the jointing of saws and is designed particularly for use in connection with the jointing of circular saws.

The principal object of the present invention is to provide a device which will facilitate the truing-up of a circular saw and which also may be used as a gauge for facilitating the cutting of the drags.

In connection with the servicing of circular saws it is at present the common practice to true-up the saw by holding a cutting implement or an emery stone in such position as to drag across the points of the teeth while the saw is rotating so as to turn or cut down all of the teeth to the same length and bring the saw back to proper circular form. In addition to the fact that this method is inaccurate because the saw filer cannot determine how much of the teeth is being cut away, it is highly dangerous.

The present invention provides a device which can be mounted in a position to maintain a cutting tool such as a file at a proper position from the radial center of the saw when the saw is mounted for rotation, whereby upon rotating the saw the points of the teeth will be caused to pass across the face of the file and the longer ones cut down so as to bring the saw back to a true circle.

Another object of the invention is, accordingly, to provide a device whereby a circular saw may have long points of the teeth cut back so as to reduce the saw to a proper circle, without hazard to the saw filer and with complete accuracy.

Another object of the invention is to provide a device of the character stated which is also adapted for use as a gauge to facilitate the cutting or filing of the drags.

Other objects and advantages of the present invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawing:

Figure 1 is a view in side elevation of a saw sharpening gauge constructed in accordance with the present invention and showing the same in applied position on a saw.

Figure 2 is a view in top plan of the same with portions broken away and the saw shown in part and in plan.

Figure 3 is a section taken substantially on the line 3—3 of Figure 1.

Figure 4 is a section taken substantially on the line 4—4 of Figure 2.

Figure 5 is a section taken substantially on the line 5—5 of Figure 2.

Referring now more particularly to the drawing the invention comprises a long flat bar member generally designated 10, which is provided along its longitudinal center with a plurality of openings 11 for the reception of the shank of a mounting and centering bolt 12 in the manner hereinafter described.

At one end of the bar there is secured upon the flat top side thereof a guide yoke which is generally designated 13 and which comprises the center arch portion 14 and the laterally extending ears 15. Through the latter extend securing bolts or screws 16 which enter threaded openings in the bar 10 to secure the yoke in position. The axial center of the under part of the yoke lies on the longitudinal center of the bar as shown and threaded through a suitable tapped opening in the top of the arched portion 14 is a set screw 17 by which is maintained in longitudinally adjusted position upon the top of the bar 10, the gauge arm 18. As shown the gauge arm is of semi-circular cross section although it is to be understood that the invention is not limited to this specific form. However, as shown the flat side of the arm 18 rests upon the top of the bar 10 and rearwardly of the yoke 13 the bar 10 has secured to the top surface thereof as by welding or in any other suitable manner the spaced parallel guide strips 19 between the opposed longitudinal edges of which the arm 18 is slidably held.

The yoke 13 is set with one side flush with an end of the bar 10 and the arm 18 projects beyond this end of the bar, which end will be referred to as the outer end, and carries upon its outer end the gauge plate or gauge head 20.

In the use of the device a suitable supporting body is employed which may be in the form of a two by six timber. Such a timber is here shown and generally designated T.

The supporting body or timber T is secured in any suitable position and is provided with a suitable opening 21 in which the shank portion of the bolt 12 is adapted to position. The upper end portion of this opening is enlarged to the proper diameter to receive a bushing 22 having upon its top end a collar 23. The bolt shank diameter is of the proper size to snugly engage in one of the openings 11 of the bar 10 and the outside diameter of the collar 22 is approximately the same as the diameter of the opening or eye 24 at the center of the circular saw which is generally designated S. The collar is passed through the saw so that the flange 23 rests upon the top thereof and forms a spacer between the saw and the bar 10.

The bar 10 is initially placed so that the outer face of the gauge head 20 will be spaced from the center of the bolt 12 a distance substantially equal to the radius of the saw. If any longitudinal adjustment of the head is required this can be accomplished by loosening the set screw 17 and shifting the gauge head arm 18 inwardly or outwardly as required.

In the use of the tool for cutting down the points of the saw teeth 24 so as to make the saw completely circular, a suitable file body 26 is placed against the radial outer face of the head 20 and secured thereto in a suitable manner by means of a clamp 27. This file or cutting tool is placed so that a portion thereof will project downwardly beyond the lower edge of the head 20 and by proper adjustment of the head it can be positioned so that the longest tooth or teeth of the saw will be cut away and reduced to the length of the other teeth so as to give the saw the desired accurate circular form.

After the file has been set, the filing operation is performed by rotating the saw in the direction of the arrow so as to wipe the points of the longer teeth along the face of the file. Thus these teeth will be cut down to the length of the remaining teeth, making the saw of true circular form.

After the operation of filing down the teeth is completed and the saw has been restored to a perfect circular form, the file is removed and the gauge head 20 may be readjusted so as to facilitate cutting the drags to the exact length desired.

From the foregoing it is believed that it will be readily apparent that by using the present tool a saw filer will be able to quickly and easily reduce the circular saw to correct circular form without cutting away more of the teeth than is necessary and without danger to himself. After the proper form of the disk has been obtained the cutting of the drags can be effected easily and quickly by using the same implement as a gauge or guide.

I claim:

In a jointing gauge for circular saws, a flat elongated bar having a longitudinal series of spaced apertures, means engageable in the shaft opening of the saw and selectively so in said apertures for adjustably securing the bar diametrically of the saw, a guide yoke on the outer end of said bar, a gauge bar adjustably secured in said yoke, a guide plate mounted on and transversely of the outer end of said gauge bar, and a C-clamp adapted to have its fixed jaw engaged with the inner side of said gauge plate and its movable jaw abutted against the outer side of a flat file positioned against the outer side of the gauge plate, the lower edge portion of said file depending below the lower edge of said guide plate for abrasive contact of the teeth of the saw therewith.

HENRY M. DIXON.

REFERENCES CITED

The following references are of record in the file of this patent:

UNITED STATES PATENTS

| Number | Name | Date |
| --- | --- | --- |
| 237,590 | Pierson | Feb. 8, 1881 |
| 269,654 | Fisher | Dec. 26, 1882 |
| 444,446 | Leith | Jan. 13, 1891 |
| 890,727 | Todd | June 16, 1908 |
| 1,043,470 | Sellers | Nov. 5, 1912 |
| 1,587,847 | Latuff | June 8, 1926 |
| 2,438,086 | Wooley | Mar. 16, 1948 |